Patented Aug. 5, 1924.

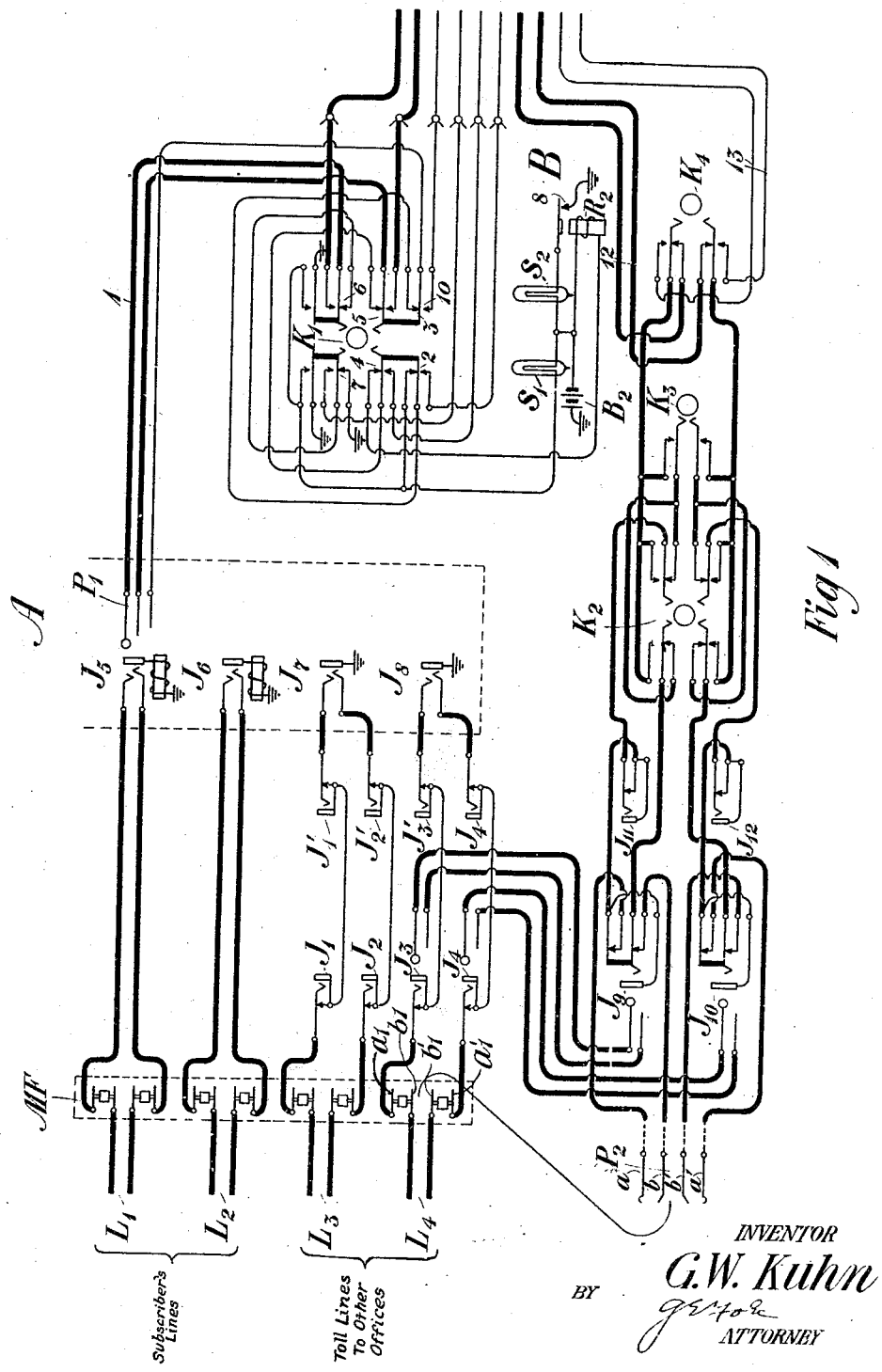

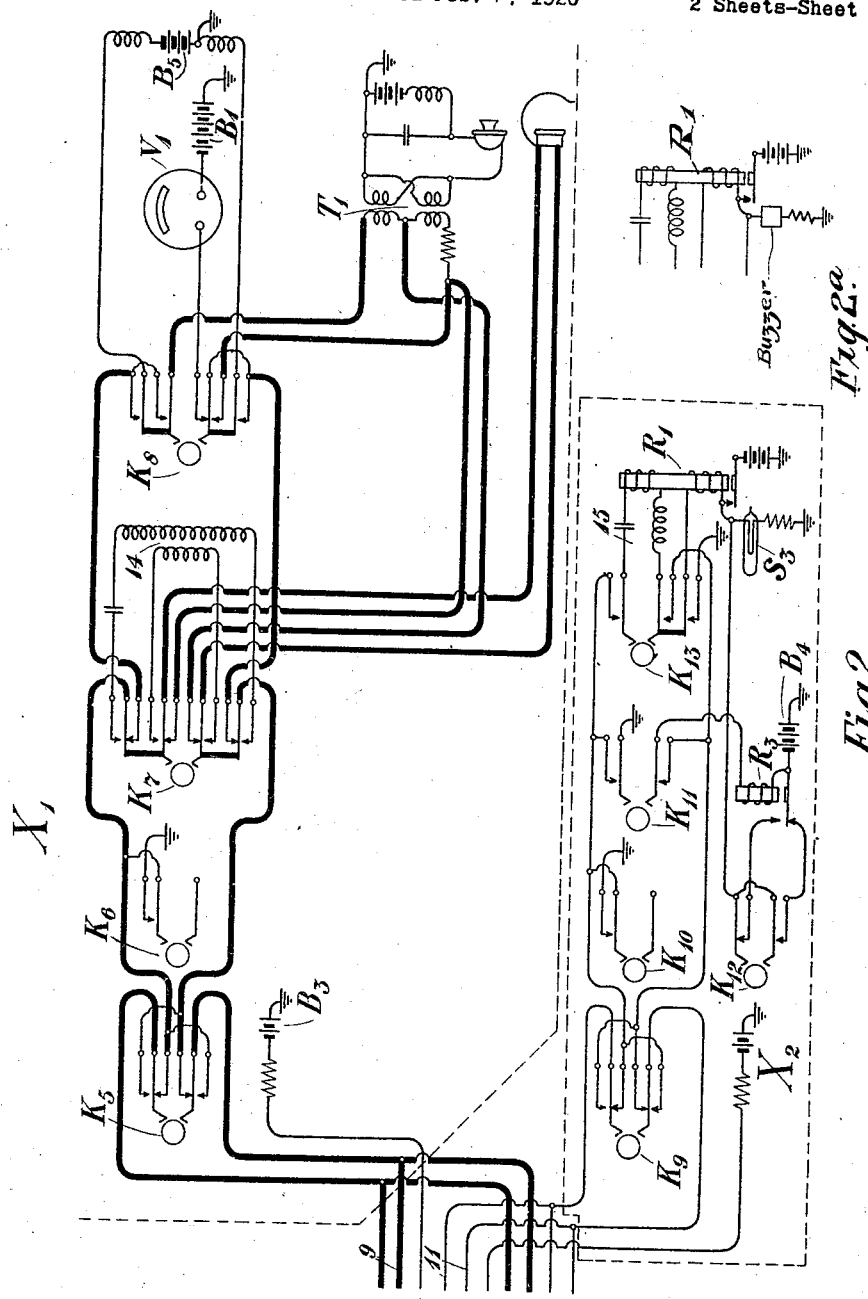

1,504,124

UNITED STATES PATENT OFFICE.

GEORGE W. KUHN, OF BROOKLYN, NEW YORK, ASSIGNOR TO AMERICAN TELEPHONE AND TELEGRAPH COMPANY, A CORPORATION OF NEW YORK.

ELECTRICAL TESTING SYSTEM.

Application filed February 7, 1920. Serial No. 356,836.

*To all whom it may concern:*

Be it known that I, GEORGE W. KUHN, residing at Brooklyn, in the county of Kings and State of New York, have invented certain Improvements in Electrical Testing Systems, of which the following is a specification.

This invention relates to electrical testing systems and more particularly to an arrangement adapted for testing telephone or telegraph signaling circuits.

In testing systems heretofore used it has been customary to provide at the central office a test trunk or a group of such trunks extending for example from the switchboard, main distributing frame or jack panel to a test desk for the purpose of connecting telephone lines of various types with the testing circuits and apparatus located at the test desk. These test trunks normally terminated in jacks at the test desk which was equipped with a cord or a plurality of cords as a part of the permanent and fixed apparatus of the test desk to connect the test trunks with the testing circuits. One of the objects of this invention is to provide a test desk which is substantially cordless, that is, free from cords that form a part of the permanent key shelf equipment. In order to establish temporary connections between circuits which loop through the test desk and the testing circuit itself, patching cords of the well known removable type are provided, which form no part of the fixed apparatus of the test desk.

Furthermore it has been found desirable to divide into two spearate testing circuits certain features which formerly were combined in a single testing circuit. Thus for example the volt-meter circuit, embracing a source of testing potential, and reversing and grounding keys together with a telephone circuit constitute what is hereinafter referred to as the primary testing circuit. Certain other features are grouped together in what is hereinafter referred to as the secondary testing circuit. Another object of this invention is to provide in connection with each test trunk from the test desk to the switchboard switching means for connecting the said trunk with either the primary or the secondary testing circuits. This invention also provides similar switching means associated with the test trunks from the test desk to the main distributing frame, and with the patching cords within the test desk itself for connecting these circuits with either of said testing circuits.

Another object of this invention is to provide means for connecting together lines such as two incoming toll lines, so that the connecting link may be connected with either the primary or secondary testing circuits whereby the looped circuits may be supervised and tested.

These and other objects of the invention will be made clear from the following description when read in connection with the attached drawing embracing Figures 1 and 2, which when Fig. 2 is placed to the right of Fig. 1 shows a plurality of line circuits of various types, testing circuits and switching circuits adapted to connect the testing circuits with line circuits; and Fig. $2^a$ shows a detail of Fig. 2.

In Fig. 1, $L_1$ and $L_2$ represent subscribers' lines extending from the switchboard A to subscribers' stations. $L_3$ and $L_4$ represent two toll lines which extend from the switchboard A to other offices, and for the purpose of description it will be understood that they extend to two different offices. The lines $L_3$ and $L_4$ loop through the series jacks $J_1$, $J_2$, $J_3$ and $J_4$ and $J_1'$, $J_2'$, $J_3'$ and $J_4'$, which are preferably located in the test desk B at the office in which switchboard A is located. The lines $L_1$, $L_2$, $L_3$ and $L_4$ are cross connected at the main frame MF with the drop side of the circuits, the line side and the drop side of each circuit being connected with the inner and the outer springs respectively of the protector at the distributing frame.

At the switchboard A the jacks $J_5$, $J_6$, $J_7$ and $J_8$, serve to terminate the lines $L_1$, $L_2$, $L_3$ and $L_4$, respectively. Also at this switchboard, and preferably at what is known as the "trouble position" thereof, is located plug $P_1$, having a cord associated therewith which serves to terminate a test trunk 1 extending from the test desk B to the switchboard. Although a single plug and trunk are shown, it is to be understood that a plurality of these trunks and plugs may be provided depending upon the volume of testing. Associated with each trunk is a key $K_1$, adapted to connect the trunk and any line that may be connected therewith with either the primary testing circuit $X_1$ or the secondary testing circuit $X_2$. The key $K_1$ has associated therewith the lamps $S_1$ and $S_2$, $S_1$ indicating the connection of the trunk 1 with any of the circuits terminating at the switchboard, and $S_2$ responding to direct current signals transmitted over a line with which the trunk 1 may be connected, as, for example, the operation of the switchhook of a subscriber's telephone set.

Associated with the test trunk to the main frame is a group of jacks $J_9$, $J_{10}$, $J_{11}$ and $J_{12}$, which together with certain cords afford the means for connecting the lines $L_3$ and $L_4$ directly with the testing circuits $X_1$ and $X_2$ and also afford means for establishing a supervised looping connection between the lines $L_3$ and $L_4$. Connected with the test trunk to the main frame and located at the main frame is a four-conductor plug $P_2$ which is adapted for insertion between the protector springs at the main frame, the contacts $a$ and $a'$ establishing connection with the drop side of the circuit and the contacts $b$ and $b'$ connecting with the line side of the same circuit. It should be noted that the connection between the line side and the drop side of a circuit is not opened when the said circuit is connected with the test trunk to the main frame either by means of cords between jacks $J_1$, $J_2$, $J_3$, $J_4$ and jacks $J_9$ and $J_{10}$, or by inserting plug $P_2$ in the protector springs at the main frame. The circuit thus connected with the test trunk has its line and drop sides connected through the contacts of certain jacks and keys related to the test trunk, and the through connection between the line and the switchboard will be opened only by some subsequent operation. Associated with the test trunk to the main frame is a key $K_2$ which when operated towards the left serves to split the circuit and to connect the line side of the circuit with the testing circuits, and when operated to the right to split the circuit and to connect the drop side of the circuit with the testing circuits. Key $K_3$ is adapted to connect the test trunk with the testing circuits, without splitting said trunk when key $K_2$ is in its normal position. $K_4$ is a switching key designed to connect the test trunk and any associated circuit with either the testing circuit $X_1$ or $X_2$.

Fig. 2 shows schematically two testing circuits $X_1$ and $X_2$. In $X_1$ we have represented the principal features of the well known telephone line testing circuit. $V_1$ represents a volt meter having connected thereto a testing battery $B_1$ of suitable potential. Battery $B_5$ is adapted to supply talking current to a line with which the circuit $X_1$ may be connected. Associated with the testing circuit $X_1$ is a reversing key $K_5$, adapted to reverse the connection of the tip and ring conductors with respect to the volt meter and testing battery. The key $K_6$ is designed to connect one side of the line with ground.

The keys $K_7$ and $K_8$ connect the telephone set $T_1$ with the testing circuit, the key $K_7$ establishing simply a monitoring connection and the key $K_8$ a complete talking connection. The circuit $X_2$ is designed to cooperate with the circuit $X_1$ in the performance of certain tests and is also adapted to operate independently of $X_1$ in the performance of other tests. The key $K_9$ is designed to reverse the connections of the two sides of the line, and key $K_{10}$ to ground one side of the said line. Keys $K_{11}$ and $K_{12}$ are designed to control the signaling apparatus functioning in a supervisory capacity and assisting the test man in clearing trouble upon certain circuits, which will be more fully described hereafter. The key $K_{13}$ serves to bridge across the sides of the circuit $X_2$ the relay $R_1$ which serves to operate the lamp $S_3$ whenever a ring-down signal is received over a line with which the circuit $X_2$ may be connected.

Having in mind the foregoing description of the circuits in which the invention is embodied, and the functions they perform, the invention will be made clear from the following description of the mode of operation of these circuits. Let it be assumed that an outside troubleman has called the office over the subscriber's line $L_1$, and established communication with the operator at A. The operator will thereupon connect the said line with the test trunk 1 by inserting the plug $P_1$ in the jack $J_5$, which establishes a circuit from battery $B_2$, lamp $S_1$, contacts 2 and 3 of key $K_1$ sleeve contacts of plug $P_1$ and jack $J_5$ and cut-off relay to ground, thus lighting lamp $S_1$ to attract the attention of the testman. The cut-off relay of line $L_1$ is also operated thereby.

Since the battery $B_2$ is connected through the winding of relay $R_2$ with the ring side of the line and the tip side of the line is normally grounded over the contacts 6 and 7 of key $K_1$, the relay $R_2$ would respond when the troubleman's telephone set was bridged across said line, and the lamp $S_2$ would be lighted by current from the battery $B_2$, through contact 8 of relay $R_2$. The lighting of the lamp $S_2$ leads the test man to operate the key $K_1$ towards the right, thereby connecting the line $L_1$ over the test trunk 1 and the conductors 9 with the testing circuit $X_1$. By the operation of the key $K_8$ associated with the circuit $X_1$, the test man would be enabled to talk with the troubleman on the line $L_1$. By the operation of the key $K_1$, the relay $R_2$ would be released, due to the opening of the contact 5, which would extinguish the lamp $S_2$, but the release of the cut-off relay of line $L_1$ is prevented however by flow of current from the battery $B_3$ of the circuit $X_1$, over contact 10 of key $K_1$ and the sleeve circuit heretofore traced.

The test man after communicating with the lineman will probably test the circuit by means of the volt meter and the keys $K_5$ and $K_6$ to determine whether or not the line is O. K. If the test shows that the fault still exists on the line it will necessitate further inspection and work on the part of the troubleman. Since the major portion of line testing is done with the apparatus of the circuit $X_1$, it is undesirable to tie up this apparatus with the particular circuit upon which the troubleman is trying to locate a fault especially if at the same time there are other lines upon which tests are desirable. In order therefore to release the circuit $X_1$ and at the same time to maintain the continuity of the circuit between the test desk and the troubleman in the field, the key $K_1$ is operated towards the left which serves to connect the line $L_1$ and the trunk 1 with the secondary testing circuits $X_2$. If the key $K_{11}$ of circuit $X_2$ is also operated, the relay $R_3$ and battery $B_4$ will be connected with the circuit and the said relay will be responsive to the bridging of the troubleman's telephone set across line $L_1$. The operation of relay $R_3$ will effect the lighting of lamp $S_3$ thus indicating to the testman that the troubleman wants to talk to him. The testman will then operate the key $K_1$ to the right to connect the test trunk with the circuit $X_1$ with which the telephone $T_1$ is associated. It will be seen from the foregoing that this arrangement provides a cordless test desk having a plurality of test trunks to the switchboard, each having a signal to indicate when the test trunk has been connected with a line, also a signal responsive to the connection of a telephone set across the said line, switching means adapted to connect the line under test with each of a plurality of testing circuits, one of the said testing circuits having a relay associated therewith, which is responsive to the connection of the telephone set with said line.

The test trunk from the test desk to the main frame facilitates the connecting of the testing circuits with the line circuits at some point between their terminals such as the main frame, jack panel, etc., instead of at a terminating point such as the switchboard. The function of this test trunk will be made clear from the following description of the various ways in which it may be used.

In order to determine whether a circuit trouble exists on the drop side or on the line side of the main frame, a testing connection may be made by inserting the plug $P_2$ between the spring contacts at the main frame in a manner that is well known to those familiar with the art. This does not split the circuit which still remains closed through the contacts of jacks $J_9$, $J_{10}$, $J_{11}$ and $J_{12}$ and of the key $K_2$. Since it is desirable to test or listen in on the circuit before opening it, this may be done by operating the key $K_3$ and $K_7$, which will serve to connect the receiver of the set $T_1$ of the circuit $X_1$ with the line circuit which the plug $P_2$ is connected. By operating the key $K_2$ to the left, the line conductors associated with the contacts $b$ and $b'$ will be connected through the key $K_4$ and conductors 12 with the circuit $X_1$ by means of which the usual test for the location of faults may be made. By operating the key $K_2$ to the right, the conductors of the drop side of the circuit will be connected over the contacts $a$ and $a'$, and conductors 12 with the circuit $X_1$. In this way a determination may be made whether the fault in a circuit exists on the line side of the main frame or on the drop side of the frame.

After this preliminary test has been made, the test man will operate the key $K_4$ which serves to connect the test trunk to the main frame with the circuit $X_2$. If the test showed the fault to be on the line side of the circuit, that is to say outside the office, a troubleman would be sent to locate and, if practicable, clear the trouble. In order to facilitate communication between the troubleman and the testman, suitable signaling means have been provided at the test desk. If the circuit upon which the troubleman is working is, for example a subscriber's line, the testman will maintain key $K_{11}$ operated which serves to connect to the test trunk relay $R_3$ and battery $B_4$ which respond to the bridging of the troubleman's telephone set across the said line. If, for example, the circuit at fault is a toll line, key $K_{13}$ will be operated which connects across the test trunk relay $R_1$ which responds to ringing current and lights the lamp $S_3$. Upon the receipt of a signal in either way, the testman will take up the call in the regular way. If the trouble exists within the office that is to say on the drop side of the main frame, the key $K_2$ will be operated to the right, and the keys $K_4$ and $K_{11}$ will also be operated. If the trouble is a short circuit, or a ground on the ring side of the line current will flow from battery $B_4$ over the ring side of the circuit to ground either at the fault, or, if short circuited, at the contact of key $K_{11}$. This will cause the operation of the relay $R_3$ which in turn will cause the lighting of the lamp $S_3$ or the operation of an audible signal such as a buzzer as shown in Fig. 2$^a$. If a buzzer is used in place of or in addition to the lamp $S_3$, the continued operation of the buzzer during the time necessary to locate the trouble would be annoying. Accordingly, the key $K_{12}$ is operated, which by the opening of its upper contact, opens the circuit through the lamp $S_3$ and the buzzer. When the short circuit has been cleared, the relay $R_3$ will be released, thereby allowing its armature to fall back, which closes a circuit from battery $B_4$ through the lower contact of key $K_{12}$ to the lamp or the buzzer associated therewith. The lighting of the lamp or the operation of the buzzer indicates to the testman that the fault has been cleared. It will be seen from the foregoing that this arrangement provides a test trunk adapted to connect each of a plurality of testing circuits with a line circuit at some point between the terminals of the said line circuit without rendering the said line circuit discontinuous. The test trunk, is, however designed to be split, whereby either the line side or the drop side of a line circuit connected thereto may be connected with either of said testing circuits in order to be tested or to have connected thereto suitable signaling apparatus responsive to signals from a troubleman working upon said line circuit.

Furthermore it is practicable to make tests upon lines such as $L_3$ and $L_4$ which loop through jacks at the test desk by connecting the jacks such as $J_3$ and $J_4$ with the jacks $J_9$ and $J_{10}$ by means of cords having plugs at each end adapted for insertion in their respective jacks. It will be seen that when a connection by means of double plugged cords as shown in Fig. 1 has been established and the key $K_2$ remains in its normal position, the test trunk and its associated line circuit $L_4$ are not split at the test desk but continue to be connected with the jack $J_8$ at the switchboard A. The line $L_4$ may be tested in each direction from the jacks $J_3$ and $J_4$ in a manner similar to that pursued when the plug $P_2$ was inserted in the spring contacts of the main frame, heretofore described.

If as previously stated, the line $L_3$ is assumed to extend to a different office from that to which the line $L_4$ extends and it is desired to connect these two circuits together at the test desk B in order to form a continuous circuit between these two different offices and at the same time supervise at the test desk the connection thus established, it may be done in the following manner. The line jacks $J_1$ and $J_2$ may be connected with the jacks $J_9$ and $J_{10}$ respectively, by means of single conductor cords which connect together the tip contacts of the respective pairs of jacks. In like manner the line jacks $J_3$ and $J_4$ may be connected with the jacks $J_{11}$ and $J_{12}$, respectively. It will be seen therefore that the tip side of line $L_3$ will be connected with the tip contact of jack $J_9$ and through the contacts of key $K_2$ and the tip contact of jack $J_{11}$ with the tip side of the line $L_4$. Similarly the ring side of the line $L_3$, which is associated with the jack $J_2$ will be connected with the ring side of the line $L_4$, which is associated with the jack $J_4$.

It will be seen from the foregoing that all of the terminal apparatus associated with the drop side of the lines $L_3$ and $L_4$ has been disconnected therefrom by the insertion of the plugs of the cords in the jacks $J_1$, $J_2$, $J_3$ and $J_4$. When this looping connection has been established it may be supervised and tested by the manipulation of the proper keys associated with the test trunk and the testing circuits. By the operation of the keys $K_3$ and $K_7$ a high impedance repeating coil 14 is bridged across the looped circuit. If it is desired that the distant offices of the lines $L_3$ and $L_4$ shall be able to signal the office at which the test desk is located, this may be done by operating keys $K_3$, $K_4$ and $K_{13}$. As the result of the operation of these keys, the looped circuit formed from the lines $L_3$ and $L_4$ still remains unopened at the test desk B but has bridged across it the relay $R_1$ which is responsive to ringing current transmitted over either lines $L_3$ or $L_4$. The retardation coil 15 inserted in series with the winding of the relay $R_1$ is adapted to cut down transmission losses when the relay is bridged across the looped circuits. From the foregoing it is apparent that this arrangement provides a simple means for looping circuits that terminate in the same office and for supervising the circuits thus established. Such supervision may be maintained either by means of the telephone circuit $T_1$ of the circuit $X_1$ or by means of a ring down relay such as the relay $R_1$ of the circuit $X_2$.

Although this invention has been shown embodied in a specific form, it is apparent that it is capable of embodiment in other forms within the scope of the appended claims.

What is claimed is:

1. In a testing system, the combination of a telephone line circuit terminating at a switchboard but adapted to loop through a plurality of jacks located at a test desk, a plurality of testing circuits, a test trunk for connecting with any of said testing circuits, a plurality of patching cords to connect said line circuit with said test trunk, the said test trunk having switching means associated therewith whereby said line circuit may be opened for testing in each direction from said point of opening.

2. In a testing system, the combination of a plurality of telephone line circuits adapted to terminate at a switchboard, each circuit having a plurality of jacks associated therewith and located at a test desk through which the said line circuits loop, a plurality of testing circuits, a test trunk for connecting with each of said testing circuits, a plurality of cords adapted to connect with the said test trunk the line side of each line circuit whereby the incoming line circuits may be connected together, the said test trunk having means associated therewith for connecting the looped line circuits with the said testing circuits for supervision and testing.

3. In a testing system, the combination of a plurality of line circuits, a plurality of test trunks extending from a test desk to a switchboard each adapted for connection with any line circuit, a plurality of testing circuits and a plurality of switching means individual to each test trunk to connect the respective trunk with any of said testing circuits.

4. In a system for testing signaling circuits, the combination with a subscriber's circuit of a switchboard at which the said circuit is terminated, a toll circuit also terminating at the said switchboard, a test-desk having jacks therein through which the said toll circuit loops, a plurality of testing circuits, a testing trunk extending from the said test-desk to the said switchboard and having means to connect the said subscriber's circuit with any of said testing circuits, and a second testing trunk also having means to connect the said toll circuit with any of said testing circuits.

5. In a system for testing signaling circuits, the combination with a subscriber's circuit of a switchboard at which the said circuit is terminated, a toll circuit also terminating at the said switchboard, a test-desk having jacks therein through which the said toll circuit loops, a testing circuit having a galvanometer and a telephone set connected therewith, a second testing circuit having connected therewith a signaling device responsive to signals transmitted over either the said subscriber's circuit or the said toll circuit, and testing trunks having means to connect the said subscriber's circuit and the said toll circuit respectively with either of said testing circuits.

In testimony whereof, I have signed my name to this specification this 5th day of February, 1920.

GEORGE W. KUHN.